US012381337B2

(12) United States Patent
Kanematsu et al.

(10) Patent No.: US 12,381,337 B2
(45) Date of Patent: Aug. 5, 2025

(54) BUSBAR CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yuta Kanematsu, Mie (JP); Junichi Mukuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 360 days.

(21) Appl. No.: 17/909,532

(22) PCT Filed: Feb. 26, 2021

(86) PCT No.: PCT/JP2021/007250
§ 371 (c)(1),
(2) Date: Sep. 6, 2022

(87) PCT Pub. No.: WO2021/187046
PCT Pub. Date: Sep. 23, 2021

(65) Prior Publication Data
US 2023/0115788 A1 Apr. 13, 2023

(30) Foreign Application Priority Data
Mar. 18, 2020 (JP) ................................ 2020-047452

(51) Int. Cl.
*H01R 4/48* (2006.01)

(52) U.S. Cl.
CPC ..................................... *H01R 4/48* (2013.01)

(58) Field of Classification Search
CPC ....................................................... H01R 4/48
(Continued)

(56) References Cited

U.S. PATENT DOCUMENTS 3,691,512 A * 9/1972 Exner ................. H01R 13/533 174/209
4,213,003 A * 7/1980 Carlson ................. H02G 5/007 174/68.2

(Continued)

FOREIGN PATENT DOCUMENTS

JP 2017-112031 A 6/2017

OTHER PUBLICATIONS

International Search Report issued on Apr. 27, 2021 for WO 2021/187046 A1 (4 pages).

*Primary Examiner* — Phuong K Dinh
(74) *Attorney, Agent, or Firm* — Venjuris, P.C.

(57) ABSTRACT

One aspect of the present disclosure is to provide a connector enabling good heat dissipation. A connector 11 according to the one aspect of the present disclosure is provided with a housing 13 made of metal, a flat plate-like busbar 14 to be held in the housing 13, a ceramic member 20 to be interposed between one flat surface **14*a* of the busbar 14 and a contact portion 19 of the housing 13, and compression coil springs 21 for pressing another flat surface 14*b* of the busbar 14 toward the contact portion 19**.

6 Claims, 2 Drawing Sheets

(58) Field of Classification Search
USPC .................................................. 439/212, 213
See application file for complete search history.

(56) References Cited

U.S. PATENT DOCUMENTS

| | | | | |
|---|---|---|---|---|
| 4,462,657 | A | 7/1984 | Snowdon et al. | |
| 7,744,386 | B1 | 6/2010 | Speidel et al. | |
| 7,875,818 | B1 * | 1/2011 | Chen ...................... | H01H 23/04 361/624 |
| 9,833,721 | B2 * | 12/2017 | Plouffe .................. | A63H 27/10 |
| 2013/0033098 | A1 | 2/2013 | Nagashima et al. | |
| 2017/0179786 | A1 | 6/2017 | Goto et al. | |
| 2018/0054026 | A1 * | 2/2018 | Nolting .................. | H01R 43/24 |

* cited by examiner

BUSBAR CONNECTOR

CROSS REFERENCE TO RELATED APPLICATIONS

This application is a national phase of PCT application No. PCT/JP2021/007250, filed on 26 Feb. 2021, which claims priority from Japanese patent application No. 2020-047452, filed on 18 Mar. 2020, all of which are incorporated herein by reference.

TECHNICAL FIELD

The present disclosure relates to a connector.

BACKGROUND

Conventionally, a connector is known which includes a housing made of metal, a conductor held in the housing and an intermediate insulating portion provided between the conductor and the housing (see, for example, Patent Document 1). In such a connector, the heat dissipation of a busbar is improved if the intermediate insulating portion is a ceramic member having a high thermal conductivity.

PRIOR ART DOCUMENT

Patent Document

Patent Document 1: JP 2018-510462 A

SUMMARY OF THE INVENTION

Problems to be Solved

However, in the above connector, a tiny gap may be formed between the busbar and the housing due to dimensional errors and a difference in coefficient of liner expansion by a configuration in which the ceramic member is merely placed adjacent to the busbar and the housing, and there has been a problem that thermal contact resistance increases to deteriorate heat dissipation.

The present disclosure aims to provide a connector enabling good heat dissipation.

Means to Solve the Problem

The present disclosure is directed to a connector with a housing made of metal, a flat plate-like busbar to be held in the housing, a ceramic member to be interposed between one flat surface of the busbar and a contact portion of the housing, and a pressing member for pressing another flat surface of the busbar toward the contact portion.

Effect of the Invention

According to the connector of the present disclosure, good heat dissipation is enabled.

DETAILED DESCRIPTION TO EXECUTE THE INVENTION

Description of Embodiments of Present Disclosure

Figure 1:
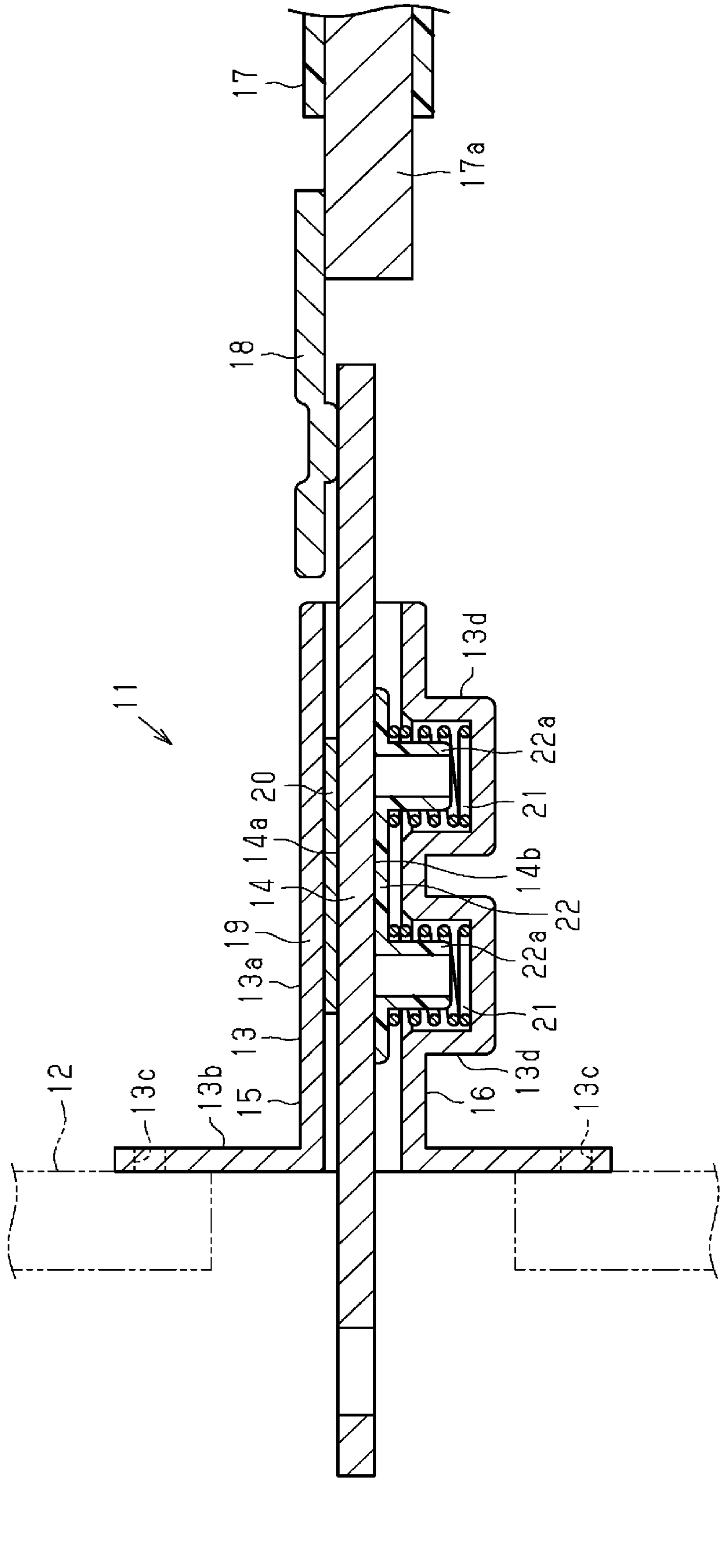
FIG. 1 is a section of a connector in one embodiment.

First, embodiments of the present disclosure are listed and described.

[1] The connector of the present disclosure is provided with a housing made of metal, a flat plate-like busbar to be held in the housing, a ceramic member to be interposed between one flat surface of the busbar and a contact portion of the housing, and a pressing member for pressing another flat surface of the busbar toward the contact portion.

According to this configuration, the other flat surface of the busbar is pressed toward the contact portion by the pressing member and the one flat surface of the busbar is pressed into contact with the contact portion of the housing via the ceramic member. Thus, a state where the one flat surface of the busbar is in contact with the contact portion of the housing via the ceramic member having a high thermal conductivity without any gap is maintained and the heat dissipation of the busbar is improved.

[2] Preferably, a plurality of the pressing members are provided.

According to this configuration, since the plurality of pressing members are provided, the busbar can be stably pressed against the ceramic member.

[3] Preferably, the connector includes a contact member to be brought into contact with the other flat surface of the busbar and pressed by the pressing member, and a facing surface of the contact member facing the busbar is set equal to or longer than a length of the ceramic member in an extending direction of the busbar.

According to this configuration, since the facing surface of the contact member facing the busbar, which surface is brought into contact with the other flat surface of the busbar and pressed by the pressing member, is set equal to or longer than the length of the ceramic member in the extending direction of the busbar, the busbar can be stably pressed against the ceramic member.

[4] Preferably, the connector includes a contact member to be brought into contact with the other flat surface of the busbar and pressed by the pressing member, and a facing surface of the contact member facing the busbar is set equal to or longer than a length of the busbar in a width direction of the busbar.

According to this configuration, since the facing surface of the contact member facing the busbar, which surface is brought into contact with the other flat surface of the busbar and pressed by the pressing member, is set equal to or longer than the length of the busbar in the width direction of the busbar, the busbar can be stably pressed against the ceramic member.

[5] Preferably, a facing surface of the ceramic member facing the busbar is set equal to or longer than a length of the busbar in a width direction of the busbar.

According to this configuration, since the facing surface of the ceramic member facing the busbar is set equal to or longer than the length of the busbar in the width direction of the busbar, the busbar can be stably pressed against the ceramic member. Further, since the busbar can be entirely held in contact with the ceramic member in the width direction, heat dissipation is improved.

Details of Embodiment of Present Disclosure

A specific example of a connector of the present disclosure is described below with reference to the drawings. Note that the present invention is not limited to these illustrations and is intended to be represented by claims and include all changes in the scope of claims and in the meaning and scope of equivalents.

As shown in FIG. 1, a connector 11 is provided with a housing 13 to be connected to an electrical device 12 such as an inverter and flat plate-like busbars 14 held in the housing 13.

The housing 13 is made of metal and, in this embodiment, made of aluminum. The housing 13 includes tube portions 13*a* substantially in the form of rectangular tubes in which the busbars 14 are inserted and held, and a flange portion 13*b* extending in a flange-like manner from openings of tip sides of the tube portions 13*a*.

Figure 2:
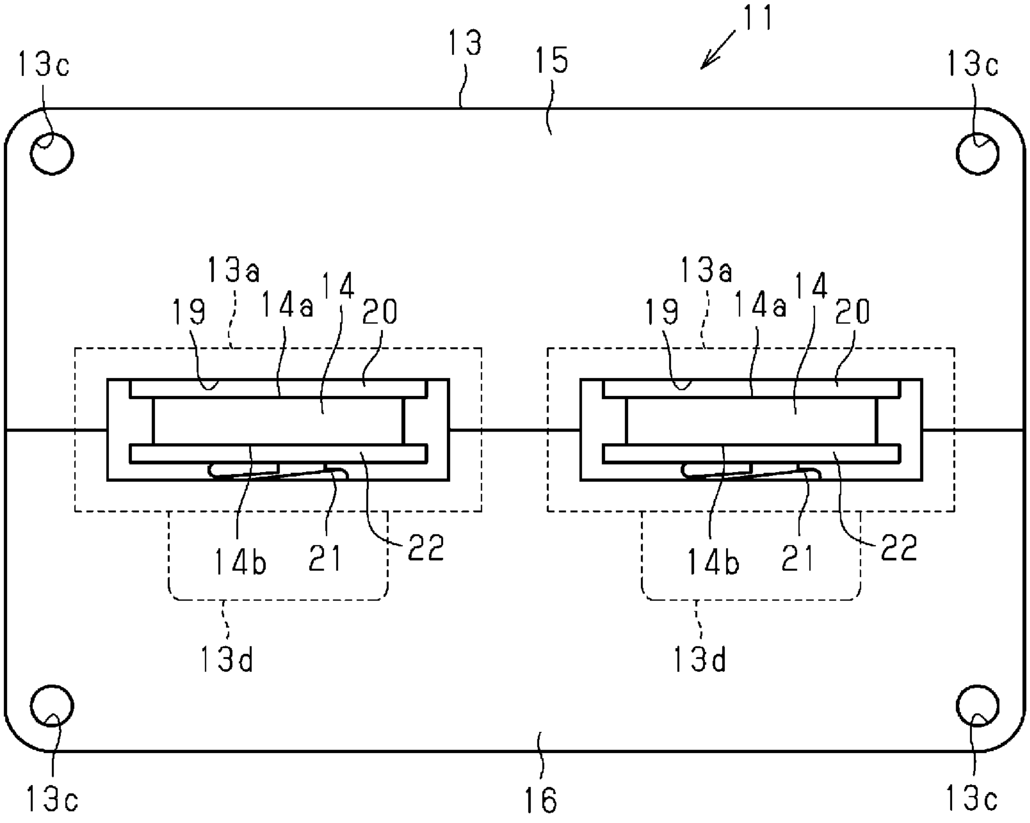
FIG. 2 is a front view of the connector in the embodiment.

As shown in FIG. 2, a pair of the tube portions 13*a* are provided side by side in a width direction of the busbars 14. Further, fixing holes 13*c* are provided on four corners of the flange portion 13*b* in the housing 13. The connector 11 is fixed to the electrical device 12 by unillustrated screws to be inserted into the fixing holes 13*c* and threadably engaged with the electrical device 12. Further, the housing 13 of this embodiment is composed of housing constituent members 15, 16 shaped by being divided in a direction orthogonal to an arrangement direction of the tube portions 13*a*, i.e. in a vertical direction in FIG. 2.

As shown in FIG. 1, a connection terminal 18 fixed to a core wire 17*a* of a wire 17 is connected to a base end side of the busbar 14. A tip side of the busbar 14 projects to the outside of the housing 13 and is connected to an unillustrated connection terminal of the electrical device 12.

Here, the connector 11 of this embodiment includes ceramic members 20 each interposed between one flat surface 14*a* of the busbar 14 and a contact portion 19 of the housing 13, and compression coil springs 21 serving as pressing members for pressing the other flat surfaces 14*b* of the busbars 14 toward the contact portions 19.

In particular, the ceramic member 20 is, for example, made of alumina, has an insulating property, and has a higher thermal conductivity than resin materials and the like. The ceramic member 20 is in the form of a flat plate and interposed between the one flat surface 14*a* of the busbar 14 and the contact portion 19, which is the upper wall of the tube portion 13*a* of the housing 13. As shown in FIG. 2, a facing surface of the ceramic member 20 facing the busbar 14 is set longer than a length of the busbar 14 in the width direction of the busbar 14. That is, a width of the ceramic member 20 of this embodiment is set longer than that of the busbar 14, and the one flat surface 14*a* of the busbar 14 is set to entirely contact the ceramic member 20 in the width direction.

Further, spring accommodating portions 13*a* are recessed in the lower wall of the tube portion 13*a* of the housing 13. A pair of the spring accommodating portions 13*d* are provided side by side in an extending direction of the busbar 14 and a longitudinal direction of the tube portion 13*a*. The compression coil spring 21 is accommodated in a vertically compressed state in each spring accommodating portion 13*d* to press the other flat surface 14*b* of the busbar 14 toward the contact portion 19.

Further, the connector 11 of this embodiment includes contact members 22 to be brought into contact with the other flat surface 14*b* of the busbar 13 and pressed by the compression coil springs 21.

The contact member 22 is, for example, made of an insulating resin material such as polybutylene terephthalate. The contact member 22 includes a pair of positioning tube portions 22*a* projecting toward a bottom side of the spring accommodating portion 13*d* while being in the form of flat plates. The compression coil springs 21 are provided to be externally fit to the positioning tube portions 22*a* and press the contact member 22 toward the busbar 14 and toward the contact portion 19.

Further, as shown in FIG. 1, a facing surface of the contact member 22 facing the busbar 14 is set longer than the length of the ceramic member 20 in the extending direction of the busbar 14.

Further, as shown in FIG. 2, the facing surface of the contact member 22 facing the busbar 14 is set longer than the length of the busbar 14 in the width direction of the busbar 14.

Next, functions of the connector 11 configured as described above are described.

In the connector 11, the other flat surface 14*b* of the busbar 14 is pressed by the compression coil springs 21, thereby maintaining a state where the one flat surface 14*a* of the busbar 14 is pressed into contact with the contact portion 19 of the housing 13 via the ceramic member 20. Thus, the formation of a tiny gap between the busbar 14 and the housing 13 due to dimensional errors and a difference in coefficient of liner expansion is suppressed.

Next, effects of this embodiment are described below.

(1) The other flat surface 14*b* of the busbar 14 is pressed toward the contact portion 19 of the housing 13 by the compression coil springs 21 and the one flat surface 14*a* of the busbar 14 is pressed into contact with the contact portion 19 of the housing 13 via the ceramic member 20. Thus, the one flat surface 14*a* of the busbar 14 is maintained in a state in contact with the contact portion 19 of the housing 13 via the ceramic member 20 having a high thermal conductivity without any gap and the heat dissipation of the busbar 14 is improved.

(2) Since a plurality of the compression coil springs 21 are provided, the busbar 14 can be stably pressed against the ceramic member 20.

(3) Since the facing surface of the contact member 22 facing the busbar 14, which surface is brought into contact with the other flat surface 14*b* of the busbar 14 and pressed by the compression coil springs 21, is set equal to or longer than the length of the ceramic member 20 in the extending direction of the busbar 14, the busbar 14 can be stably pressed against the ceramic member 20.

(4) Since the facing surface of the contact member 22 facing the busbar 14, which surface is brought into contact with the other flat surface 14*b* of the busbar 14 and pressed by the compression coil springs 21, is set equal to or longer than the length of the busbar 14 in the width direction of the busbar 14, the busbar 14 can be stably pressed against the ceramic member 20.

(5) Since the facing surface of the ceramic member 20 facing the busbar 14 is set equal to or longer than the length of the busbar 14 in the width direction of the busbar 14, the busbar 14 can be stably pressed against the ceramic member 20. Further, since the busbar 14 is entirely in contact with the ceramic member 20 in the width direction, heat dissipation is improved.

This embodiment can be modified and carried out as follows. This embodiment and the following modifications can be carried out in combination without technically contradicting each other.

Although the pressing member is the compression coil spring 21 in the above embodiment, there is no limitation to this and the pressing member may be, for example, changed to another one such as a leaf spring.

Although the two compression coil springs 21 serving as the pressing members are provided in the above embodiment, there is no limitation to this and a desired number of pressing members may be provided. For example, one, three or more pressing members may be provided.

Although the facing surface of the contact member 22 facing the busbar 14 is set longer than the length of the ceramic member 20 in the extending direction of the busbar 14 in the above embodiment, there is no limitation to this. For example, the facing surface may have the same length as the ceramic member 20 or may be shorter than the length of the ceramic member 20.

Although the facing surface of the contact member 22 facing the busbar 14 is set longer than the length of the busbar 14 in the width direction of the busbar 14 in the above embodiment, there is no limitation to this. For example, the facing surface may have the same length as the busbar 14 or may be shorter than the length of the busbar 14.

Although the facing surface of the ceramic member 20 facing the busbar 14 is set longer than the length of the busbar 14 in the width direction of the busbar 14 in the above embodiment, there is no limitation to this. For example, the facing surface may have the same length as the busbar 14 or may be shorter than the length of the busbar 14.

Although the connector 11 includes the pair of tube portions 13*a* and the pair of busbars 14 in the above embodiment, there is no limitation to this and, for example, the connector 11 may include one, three or more tube portions and one, three or more busbars.

Although the housing 13 is made of aluminum in the above embodiment, there is no limitation to this and the housing 13 may be made of another metal material.

Although the ceramic member 20 is made of alumina in the above embodiment, there is no limitation to this and the ceramic member 20 may be made of another material as long as this material has an insulating property and has a higher thermal conductivity than resin materials and the like.

As shown in FIG. 1, the contact member 22 may include a body part in the form of a flat plate, two positioning tube portions 22*a* projecting into the spring accommodating portions 13*d* from the body part and two through holes. Each through hole may penetrate through the corresponding positioning tube portion 22*a* and the body part.

The two positioning tube portions 22*a* may be arranged at positions respectively corresponding to both ends of the ceramic member 20 in the extending direction, i.e. the longitudinal direction of the busbar 14. In this way, the both ends of the ceramic member 20 are respectively pressed by the compression coil springs 21.

In the width direction of the busbar 14, the width of the contact member 22 may be equal to that of the ceramic member 20.

The present disclosure includes the following implementation examples.

Reference signs of the constituent elements of the embodiment are given not for limitation, but for understanding assistance.

[Addendum 1] A connector (11) according to an implementation example of the present disclosure may be provided with:

a housing (13) made of metal, the housing (13) including a first and a second housing constituent members (15, 16);

one or more flat plate-like busbars (14) held between the first housing constituent member (15) and the second housing constituent member (16);

one or more flat plate-like ceramic members (20) sandwiched between the first housing constituent member (15) and each busbar (14);

one or more contact members (22) arranged between each busbar (14) and the second housing constituent member (16); and one or more pressing members (21), each pressing member (21) being arranged between the corresponding contact member (22) and the second housing constituent member (16) and pressing the contact member (22), the busbar (14) and the ceramic member (20) toward the first housing constituent member (15).

[Addendum 2] In one or more implementation examples of the present disclosure, the first housing constituent member (15) may include one or more flat contact portions (19) to be held in surface contact with the ceramic member (20), and each busbar (14) may have a first flat surface (14*a*) to be held in surface contact with the corresponding ceramic member (20) and a second flat surface (14*b*) to be held in surface contact with the corresponding pressing member (21).

[Addendum 3] In one or more implementation examples of the present disclosure, the second housing constituent member (16) may include a plate-like part facing the contact portion (19) and one or more accommodating portions (13*d*) arranged in the plate-like part and open toward the contact portion (19), and each pressing member (21) may be accommodated in the corresponding accommodating portion (13*d*).

[Addendum 4] In one or more implementation examples of the present disclosure, the second housing constituent member (16) may include two accommodating portions (13*d*) arranged in a longitudinal direction of the busbars (14), and the two accommodating portions (13*d*) may be arranged at positions corresponding to both ends in the longitudinal direction of the ceramic member (20).

[Addendum 5] In one or more implementation examples of the present disclosure, a length in the longitudinal direction of the busbar (14) may be longer than a length in the longitudinal direction of the second housing constituent member (16).

[Addendum 6] In one or more implementation examples of the present disclosure, the length in the longitudinal direction of the second housing constituent member (16) may be longer than a length in the longitudinal direction of the contact member (22).

[Addendum 7] In one or more implementation examples of the present disclosure, both ends in the longitudinal direction of the busbar (14) are exposed to outside of the housing (13), and the ceramic member (20), the contact member (22) and the one or more pressing members (21) may be accommodated in the housing (13).

[Addendum 8] In one or more implementation examples of the present disclosure, the first and second housing constituent members (15, 16) may include a flange portion (13*b*) configured to be fixed to another member, e.g. an electrical device (12).

[Addendum 9] In one or more implementation examples of the present disclosure, the contact member (22) may include:

a flat plate-like body part;

one or more positioning tube portions (22*a*) projecting from the body part into the accommodating portion (13); and one or more through holes penetrating through the corresponding positioning tube portion (22*a*) and the body part.

[Addendum 10] In one or more implementation examples of the present disclosure, the pressing member (21) may be a coil spring (21) to be accommodated into the accommodating portion (13*d*) and arranged to surround an outer periphery of the positioning tube portion (22*a*).

[Addendum 11] In one or more implementation examples of the present disclosure, the coil spring (21) may have a first end to be held in contact with the body part and a second end to be held in contact with an inner surface of the accommodating portion (13*d*).

[Addendum 12] In one or more implementation examples of the present disclosure, the one or more busbars (14) may include a plurality of the busbars (14), and the plurality of busbars (14) may be arranged in a width direction thereof.

[Addendum 13] In one or more implementation examples of the present disclosure, the first and second housing constituent members (15, 16) may be shaped by dividing the housing (13) into two.

[Addendum 14] In one or more implementation examples of the present disclosure, the first and second housing constituent members (15, 16) may be divided bodies divided by a dividing surface extending along both the width direction and longitudinal direction of the one or more busbars (14).

It would be apparent to a person skilled in the art that the present invention may be embodied in other specific forms without departing from the technical concept thereof. For example, some of the components described in the embodiment (or one or more aspects thereof) may be omitted or several components may be combined. The scope of the present invention should be determined with reference to the appended claims, along with the full scope of equivalents to which such claims are entitled.

LIST OF REFERENCE NUMERALS

11 connector
12 electrical device
13 housing
13*a* tube portion
13*b* flange portion
13*c* fixing hole
13*d* spring accommodating portion
14 busbar
14*a* one flat surface
14*b* other flat surface
15, 16 housing constituent member
17 wire
17*a* core wire
18 connection terminal
19 contact portion
20 ceramic member
21 compression coil spring (pressing member)
22 contact member
22*a* positioning tube portion

What is claimed is:

1. A connector, comprising:

upper and lower housings made of metal;

a flat plate-like busbar to be interposed between the upper and lower housings;

a ceramic member to be interposed between one flat surface of the busbar and a contact portion of the upper housing; and a compression coil spring supported by the lower housing and configured to press another flat surface of the busbar toward the contact portion.

2. The connector of claim 1, wherein a plurality of the compression coil springs are provided.

3. The connector of claim 1, comprising a contact member to be brought into contact with the other flat surface of the busbar and pressed by the compression coil spring, wherein:

a facing surface of the contact member facing the busbar is set equal to or longer than a length of the ceramic member in an extending direction of the busbar.

4. The connector of claim 1, comprising a contact member to be brought into contact with the other flat surface of the busbar and pressed by the compression coil spring, wherein:

a facing surface of the contact member facing the busbar is set equal to or longer than a length of the busbar in a width direction of the busbar.

5. The connector of claim 1, wherein a facing surface of the ceramic member facing the busbar is set equal to or longer than a length of the busbar in a width direction of the busbar.

6. The connector of claim 1, further comprising:

a spring accommodating portion recessed in the lower housing and configured to accommodate the compression coil spring in a vertically compressed state.

* * * * *